United States Patent [19]

Greenbaum

[11] 4,014,135
[45] Mar. 29, 1977

[54] MODULAR CHANNEL CULTURE DEVICE
[76] Inventor: George Greenbaum, 790 Boylston St., Boston, Mass. 02199
[22] Filed: May 7, 1976
[21] Appl. No.: 684,465
[52] U.S. Cl. .................................... 47/86; 47/66
[51] Int. Cl.[2] ........................................ A01G 9/02
[58] Field of Search .............. 47/1.2, 14, 15, 16, 47/25, 32, 33, 34, 34.11, 34.13, 37

[56] References Cited
UNITED STATES PATENTS

| | | | |
|---|---|---|---|
| 1,172,787 | 2/1916 | Gray | 47/14 |
| 1,993,620 | 3/1935 | Otwell | 47/37 |
| 2,318,711 | 5/1943 | Phelan | 47/14 X |
| 3,331,154 | 7/1967 | Schilling | 47/34 R |
| 3,664,062 | 5/1972 | Danielson | 47/34.13 |
| 3,788,002 | 1/1974 | Suchka | 47/34.13 |
| 3,849,932 | 11/1974 | Adams | 47/37 |
| 3,877,172 | 4/1975 | Schwab et al. | 47/1.2 |

FOREIGN PATENTS OR APPLICATIONS

| | | | |
|---|---|---|---|
| 92,870 | 7/1953 | Netherlands | 47/34.13 |
| 7,014,511 | 4/1971 | Netherlands | 47/37 |
| 737,660 | 9/1955 | United Kingdom | 47/34.13 |
| 1,384,981 | 2/1975 | United Kingdom | 47/34.13 |

*Primary Examiner*—Edgar S. Burr
*Assistant Examiner*—James R. Feyrer
*Attorney, Agent, or Firm*—William L. Ericson

[57] ABSTRACT

A channel culture device of a type which provides multiple plant growth channels is made of a plurality of modules each having a horizontal base wall joining a pair of perforated side walls which extend upwardly and are inclined toward one another to define an interior channel of trapezoidal cross-section, having a relatively narrow opening at the top. A row of modules is placed end-to-end to define a storage channel, used primarily for moisture reserve. Placing a series of rows side-by-side in lateral abutment defines V-shaped plant growth channels between adjacent modules, and these are supplied with moisture through the perforated side walls. Various partitions may be placed within the modules to subdivide them into growth, storage, and drainage channels.

19 Claims, 13 Drawing Figures

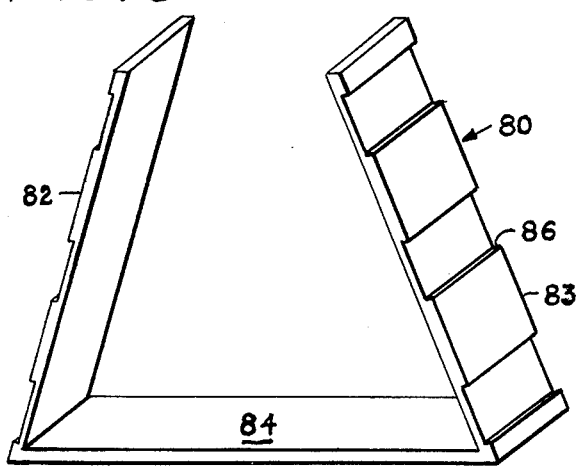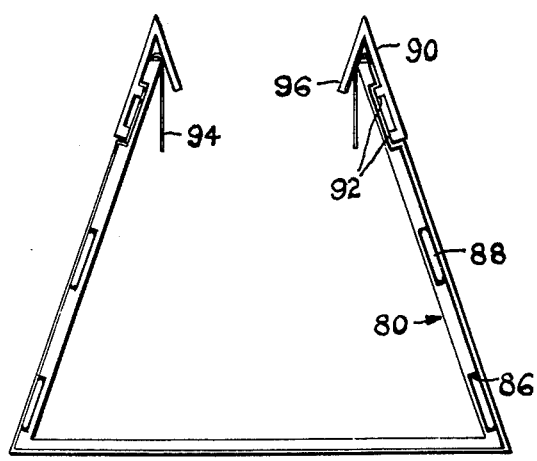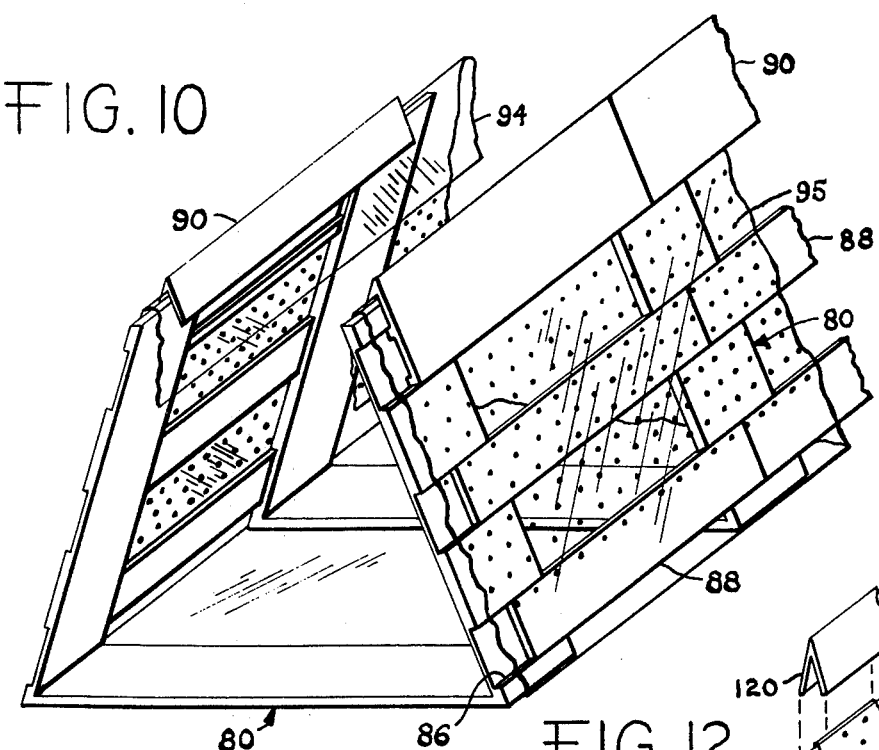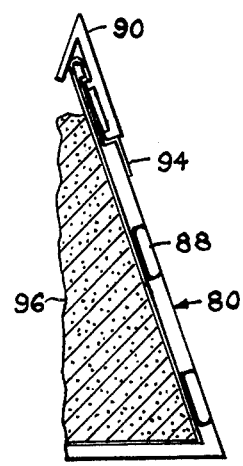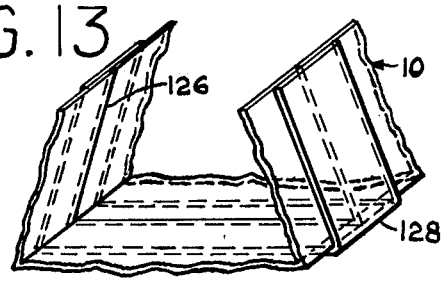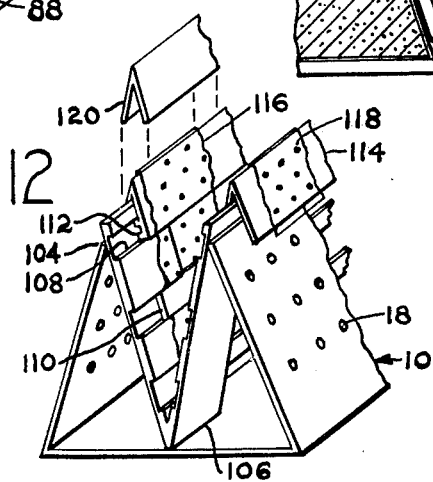

MODULAR CHANNEL CULTURE DEVICE

BACKGROUND AND BRIEF DESCRIPTION

Channel culture devices, of the type which provide multiple plant growth channels of indefinite length but of shallow depth and narrow individual width, have enormous potential value for increasing the world's food supply. The provide maximum plant production for a given supply of fertile soil, water, fertilizer, and other support chemicals, some or all of which are scarce and at an extreme premium in many parts of the world. The growth channels have a limited cross-sectional area that can be made just sufficient for the full root development of any specified plant, so that optimum availability of nutrients and water to the plants is obtained. Further, the isolation of the channels prevents the leaching and escape of the available supply of nutrients and water into the underlying soil. Isolation also simplifies the problems of cultivation, and of the control of pests, disease, and weeds.

One difficulty that has confronted the wider use of channel culture devices has been the cost, and in many needful parts of the world the scarcity, of materials and labor for their construction. Various design proposals have been made, of which some are disclosed and claimed in my copending U.S. Patent Applications Ser. No. 512,518, filed on Oct. 7, 1974, and Ser. No. 625,254, U.S. Pat. No. 3,987,585, filed on Oct. 23, 1975. Such a structure should be easy to set up quickly without skilled labor, should require only locally-available materials or light-weight materials easy to transport, and should be as cheap as possible. At the same time, the device must have structural stability so that it will not collapse under the weight of soil and water it contains.

The foregoing copending applications presented satisfactory alternative solutions for many situations, provided that there is a sufficient and fairly uniform water supply available. However, where this essential element is in limited or irregular supply, as is true in many parts of the world, there is a need for a channel culture device that is capable of storing excess moisture and making it available to the plants in arid periods; and it is an object of this invention to provide such a device. It is a further object to provide an improved channel culture device which has adjacent channels adapted to different but complementary uses. It is another object to provide an improved channel culture device which has the desirable qualities of low cost, ease of assembly and transport, and adaptability to construction from locally-available materials, but which also has an increased ability to store a reserve supply of moisture and to make it available to plants as needed. Further objects and advantages of the invention will appear as the following description proceeds.

Briefly stated, my invention is based in part on the use of a channel element of module which has a horizontal base wall joining two side walls which project upwardly at acute angles so that they are inclined toward one another. These walls form a channel with an open top narrower than the bottom wall; this may be referred to herein as a trapezoidal channel. By placing two or more such channel modules in edge-to-edge relationship, I create V-shaped or triangularsection channels between them, with walls meeting at the bottom and diverging to an open top. A series of the modules are aligned end-to-end to extend both series of channels continuously to any desired length. Because the trapezoidal channels have a small ratio of mouth area to volume, thus reducing the percentage of evaporation loss, they are employed basically as storage channels for moisture, and may serve other support purposes which will appear; while the triangular channels are used as growth channels for receiving the principle plants to be grown in the device.

The side walls of the modules are perforated so that moisture can leach at a limited rate from the trapezoidal storage channels into the triangular growth channels. Plant rootlets may also pass from the growth channels into the storage channels through these perforations to reach areas of high moisture content.

In general, the trapezoidal storage channels are filled with materials principally characterized by good moisture storage capacity, such as gravel, sand, compost, or soil mixed with vermiculite, perlite, peat moss, hydrophilic polymer foams, or nitrile starch. The triangular growth channels may be filled with soil or other known growth medium, to which suitable quantities of fertilizer and other known plant support materials may be added with a minimum of loss by escape into the material in the storage channels. The latter may serve additional purposes, such as to serve for growing an auxiliary or companion crop, e.g. soybeans or alfalfa, which can thereby furnish nitrogen to the primary crop.

I may optionally place inserts of various forms in the trapezoidal channels to subdivide them into growth, storage, or drainage sub-channels, as will appear in the detailed description which follows.

DESCRIPTION OF THE DRAWINGS

In the drawings:

FIG. 8 is a view in perspective of a rib employed in embodiments of FIGS. 9–11.

FIG. 9 is an end view of an embodiment which employs the ribs of FIG. 8 to form a composite channel module construction;

FIG. 10 is a fragmentary view in perspective of the embodiment of FIG. 9;

FIG. 11 is a fragmentary end view of another modification which employs the ribs of FIG. 8;

FIG. 12 is a fragmentary, partially-exploded view in perspective of an embodiment which employs composite V-shaped partitions; and FIG. 13 is a fragmentary view in perspective of a modification incorporating a coupling element to join adjacent channel modules.

DETAILED DESCRIPTION

Figure 1:
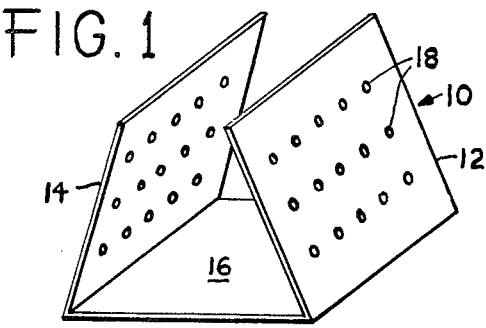
FIG. 1 is a view in perspective of a channel element or module according to a first embodiment of the invention.

FIG. 1 illustrates one form of a channel element or module 10, of which any desired number are incorporated in the improved culture device. The modules 10 should be sufficiently rigid to retain their shape against the pressure of soil, or other material with which filled in use, yet may if desired be just flexible and elastic enough to allow the end of one module to be inserted slightly inside the end of another to form a tight-fitting joint. I have found that a sheet of high-impact polystyrene 40 mils thick forms a satisfactory modules, although various other materials may be used as convenient and available, such as corrugated paperboard, cement, metal, wood, and so forth, provided they have sufficient rigidity.

The module 10 has a flat or horizontal base wall 16 joined at its lateral edges to two opposed side walls 12 and 14, which project upwardly at acute angles to the base wall and are inclined towardly one another, forming a relatively narrow opening between them at the top of the module. The base and side walls thus form a longitudinal channel 28 (FIG. 3) which has a trapezoidal cross-section, open at the top. The side walls are formed with a plurality of perforations such as shown at 18.

Figure 3:
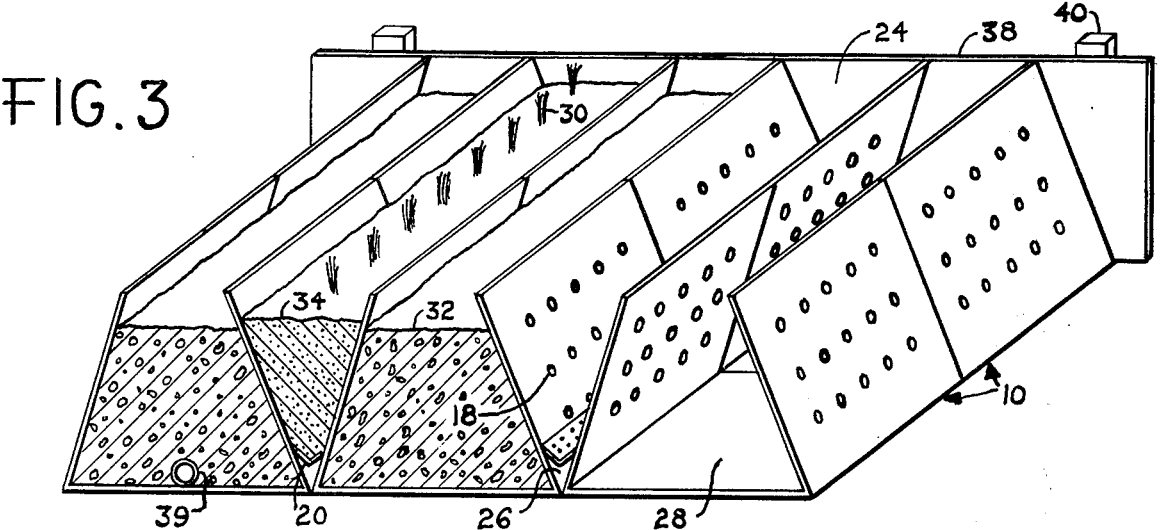
FIG. 3 is a view in perspective of a portion of an assembled channel culture device which incorporates a number of the modules of FIG. 1.

A portion of an assembled channel culture device or system is shown in FIG. 3, and comprises a series of the modules 10 which are set on the ground in a series of side-by-side laterally-abutting rows as shown, each row having any desired number of modules aligned in end-to-end abutment to enclose the sides and bottoms of the channels that are thus formed. Provided that the modules are sufficiently flexible, the end of one may be squeezed inside the adjacent end of the next to seal the joint more tightly; but a sufficient tight joint to prevent a substantial amount of material from escaping from the channels may be made merely by abutting the adjacent ends together, as shown.

The side-by-side placement of the rows of modules creates a V-shaped channel 24 between each adjacent pair of trapezoidal channels 28. The ends of the rows of modules 10 are enclosed by means such as an upright planar member 38, e.g. a wooden plank, held in place by means of stakes 40 driven into the ground. The illustration in FIG. 3 shows a system only two modules in length, with the front ends of the channels open, but it will be apparent that the construction can be extended to any desired channel length by adding additional modules, and closing the forward ends of the channels by another member such as 38.

The trapezoidal channels 28 lend themselves well to the function of moisture storage, because of their small ratio of open top area to volume, which reduces the rate of evaporation. For this purpose, these channels are filled with a medium 32 that has good moisture-retention properties, such as gravel, sand, soil or compost, with or without the addition of vermiculite, perlite, peat moss, hydrophilic polymer foams, or nitrile starch to increase water retention.

The V-shaped channels 24, on the other hand, are used as the primary plant growth channels, and are filled with soil or other plant growth medium 34, in which plants 30 are grown. The channels 24 are naturally shaped to conform to the normal root systems of food crops, and therefore give any efficient utilization of the soil 34, and of any fertilizer or other plant-supporting chemicals that may be added to it. This is of particular importance in areas where fertile soil is at a premium. Moisture contained in the trapezoidal storage channels 28 is made available to the growth channels 24 by leaching through the perforations 18, and plant rootlets may also find their way through these perforations into the storage channels to tap the moisture supply.

In the form shown in FIG. 3, the tops of the storage channels 28 are left open to receive rainfall, and complementary plants (not shown) may be grown in these channels, such as nitrogen-fixing alfalfa or soybeans, or any secondary crop. Alternatively, the storage channels may be provided with covers (not shown) to further reduce evaporation, and this would be appropriate where the entire water supply is artificially delivered. A perforated water supply conduit 39 may be extended along any of the storage channels as an optional means of supplying water artificially, in a manner known per se.

Figure 2:
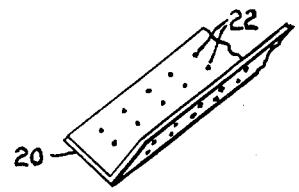
FIG. 2 is a view on an enlarged scale of a drainage strip which may optionally be used with the device.

As an optional feature, I provide drainage strips 20 (FIGS. 2 and 3) which may be V-shaped as shown, and have perforations 22. These are inserted to subdivide the growth channels 24 and form empty drainage channels 26 at their bottoms. Adequate drainage of the growth channels may be exceedingly critical under certain conditions, such as during the very early life of the plants, in germination and in the seedling phase, when excessive rain flooding the soil may destroy them if not drained adequately. The strips 20 are dimensioned to fit below the lowest perforations 18 so that the moisture supply in the storage channels 28 will not bypass the soil in the growth channels 24.

Figure 4:
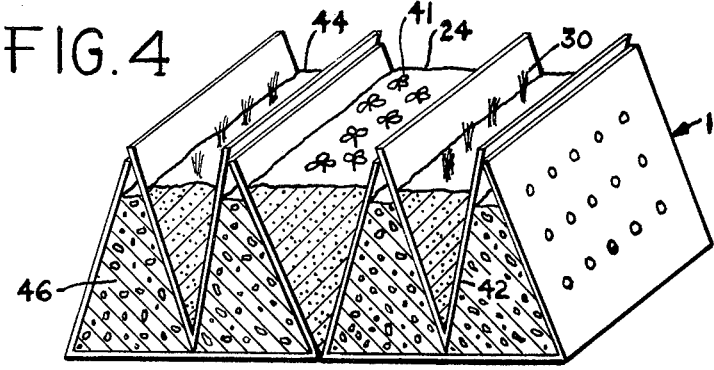
FIG. 4 is a view in perspective of a portion of a modified channel culture device which employs V-shaped partitions in addition to the channel modules of FIG. 1.

In a construction shown in FIG. 4, a series of perforated V-shaped partitions 42 are placed in the modules 10 to subdivide their trapezoidal interiors into pairs of triangular-section storage channels 46, one on each side of the partition, and a secondary growth channel 44 within the partition. To permit filling the channels 46, the partitions 42 should be sufficiently flexible that after a suitable quantity of water-retaining material has been placed in the modules, the side walls of the partitions can be squeezed together as the partition is pressed down through the material to the bottom of the module. The side walls are then released to assume their normal V-shaped form, and soil and plants 30 are placed in the channels 44. The main growth channels 24 are as in the preceding construction, and are shown with a primary plant crop 41. Since both the modules 10 and partitions 42 have perforated side walls, moisture from the storage channels supplies both sets of growth channels 24 and 44. As shown, it is perferred that the side walls of the partitions 42 reach a heights a little above the side walls of the modules, both to facilitate assembly and to insure the static stability of the soil-filled partitions.

Figure 5:
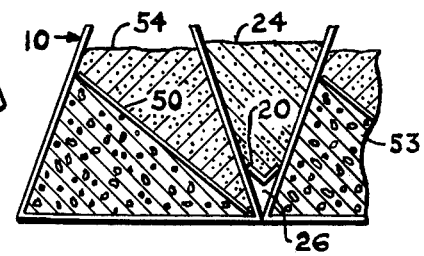
FIG. 5 is a fragmentary end view of another modification which has planar partitions.
Figure 6:
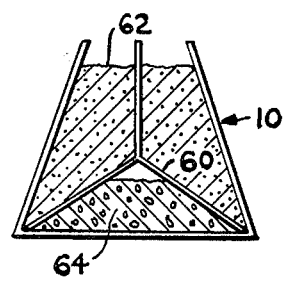
FIG. 6 is an end-view showing another modification which has a three-legged or trihedral partition.
Figure 7:
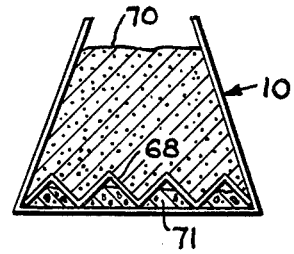
FIG. 7 is an end view of another modification which has a corrugated partition.

A modification shown in FIG. 5 employs perforated rectangular flat partitions 50 to subdivide the interior of the modules 10 into moisture storage channels 53 and secondary growth channels 54. In FIG. 6, three-legged or trihedral perforated partitions 60 subdivide the module 10 into a lower storage channel 64 and a pair of separated upper growth channels 62. The construction of FIG. 7 employs a corrugated perforated partition 68 to subdivide the module into a series of parallel storage channels 71 and a growth channel 70.

A composite construction shown in FIGS. 8–10 incorporates a series of ribs 80, each having a horizontal base or bottom wall 84 joining upwardly-extending inclined side walls 82 and 83 to form a trapezoidal interior cross section, as in preceding embodiments. The outer surfaces of the side walls are formed with a series of parallel recesses 86, into which connecting straps 88 and 90 are snap-fitted to form the composite modules. To construct the device, the lower straps 88 are snap-fitted into adjacent ribs 80 to position them in parallel spaced-apart relation. Then an elongated sheet of flexible material 94, such as plastic film, is wrapped about the sides and bottom of the module, with the edges of the sheet extending over the top and down into the channel. Finally, the straps 90 are attached to the ribs 80 over the sheet 94 to secure it in place. In the preferred form shown, the inside surface of each strap 90 has a pair of longitudinally-extending parallel flanges 92 (FIG. 9) which snap tightly into the uppermost recess 86 of each side wall 82 or 83, securely locking the sheet 94 in place. The straps 90 have an inverted V form, with a leg 96 extending down into the interior of the module, to help protect the sheet 94 from wind damage. The sheet 94 is provided with perforations 95 in the areas forming the sidewalls of the modules, but not in the area forming the bottom of the modules. The modules are extended by adding further straps 88 and 90, sheets 94, and ribs 80, in the same manner, to reach any desired length. A series of the entended modules are then built up side-by-side in laterally-abutting relation to any desired width, similar to the arrangement of FIG. 3. The device is employed in substantially the same manner as described with reference to the preceding embodiments.

It is an alternative option to arrange the body of the sheet 94 inside rather than outside the ribs 80 and straps 88, 90, and an arrangement of this kind is shown in FIG. 11, with the module filled with soil 96. This gives greater reinforcement of the sheet against outward soil pressure than does the construction of FIGS. 9 and 10.

In another embodiment shown in FIG. 12, V-shaped partitions, similar in function to those of FIG. 4, are made of a composite construction. A series of V-shaped ribs 106 are set in spaced-apart relation within the interiors of the modules 10, and connected by straps 114 of inverted V-section, which have flanges 112 that snap fit into one of a series of recesses 108 formed inside the ribs. A sheet 116 of flexible material such as plastic film, having perforations 118, is then draped within the ribs 106 to form V-shaped growth channel extending thorugh the entire length of the module, and separating two storage channels in the same general fashion as in FIG. 4. Finally, straps 110 are snap-fitted into the lower recesses 108 over the sheet 116, locking the sheet in place. It is desirable to allow enough overhang of the sheet 116 over the straps 114 and down the outside surfaces of the modules 10 to extend the sheet into soil that is later added to the device, since this helps anchor the upper part of the sheet in place. However, I prefer to add protective V-shaped cap strips 120, which rest over the straps 114 to anchor the sheet 116 securely in place; one strip 120 is shown, raised from the module for greater clarity.

The structures in FIGS. 1–7 depend either on lengthwise abutment of the modules 10 as illustrated, or on interfitting relation between modules, to prevent leakage of material from the channels. If additional sealing is desired, I provide a coupling element, shown at 128 in FIG. 13, whose interior surface conforms to the outer surface of the modules 10, and which overlaps the abutting ends of adjacent modules at their juncture 126. It will be apparent that other sealing means, such as tar or cement, could be used alternatively as desired.

What I claim is:

1. A modular channel culture device comprising, in combination:
   a plurality of modules each comprising a horizontal base wall of rectangular form and a pair of side walls joining opposite lateral edges of said base wall, projecting upwardly therefrom, and being inclined toward one another to define an opening therebetween above said base wall and narrower than said base wall, said base and side walls defining a channel of trapezoidal cross section extending parallel to said lateral edges through said module, said side walls being formed with a plurality of perforations;
   said modules being arranged in parallel rows, the modules in each row being aligned in end-to-end abutting relation to extend said trapezoidal-section channel continuously through the length of the row; said rows abutting one another laterally to define of adjacent rows, said trapezoidal and V-section channels each being adapted to contain plant-supporting medium, and said perforations connecting said trapezoidal and V-section channels in fluid-row communication.

2. A device as recited in claim 1, each of said side walls defining an acuate angle with said base wall.

3. A device as recited in claim 1, said base and side walls having a planar surfaces defining said trapezoidal channel.

4. A device as recited in claim 1, each of said modules being formed from an integral self-supporting sheet of material extending from said lateral edges of said base wall upwardly to form said side walls.

5. A device as recited in claim 1, together with a perforated drainage strip having parallel lateral edges and received in said V-shaped channel, said drainage strip being of a width to rest on said side walls of the adjacent modules above the level of the base walls thereof.

6. A device as recited in claim 5, said drainage strip having a V-shaped cross section.

7. A device as recited in claim 5, said side walls being perforated above, and imperforate below, said drainage strip.

8. A device as recited in claim 1, together with partition means received in and subdividing said trapezoidal channel into a plurality of parallel channel subdivisions, said partition means being perforated to connect said parallel subdivided channels in fluid-flow communication with one another.

9. A device as recited in claim 8, said partition means comprising dihedral structures having two leg portions intersecting to form a V-shaped cross section, and received in said trapezoidal channel with the apex of the V-shape directed downwardly.

10. A device as recited in claim 8, said partition means comprising flat sheets formed with parallel lateral edges, having widths greater than the widths of said base walls, and received in said trapezoidal channel with one lateral edge of the partition located at the junction between a side wall and base wall of the corresponding module, and the other lateral edge of the partition resting against the opposite side wall of the module at a location above the base wall thereof.

11. A device as recited in claim 8, said partition means comprising trihedral structures each received in said trapezoidal channel and having three leg portions meeting at a common intersection and radiating in different directions therefrom.

12. A device as recited in claim 8, said partition means comprising a corrugated member received in said trapezoidal channel against said bottom wall.

13. A device as recited in claim 8, said partition means comprising:
- a plurality of rib means comprising dihedral structures having two leg portions intersecting to form a V-shaped channel subdivision and received in said trapezoidal channel with the apex of the V-shaped section directed downwardly;
- a plurality of strap means attached to and joining said rib means in spaced-apart relation along said trapezoidal channel;
- and sheet means conformably engaging said rib means to extend said V-shaped channel subdivision through the length of said trapezoidal channel.

14. A device as recited in claim 1, said modules being formed as composite structures comprising:
- a plurality of rib means each having a horizontal base wall and a pair of side walls joining opposite lateral edges of said base wall, projecting upwardly therefrom, and being inclined toward one another to define an opening therebetween above said base wall narrower than said base wall, said base and side walls defining a channel of trapezoidal cross section extending parallel to said lateral edges through said rib means;
- a plurality of strap means attached to and joining said rib means in spaced-apart relation;
- and sheet means conformably engaging said rib means to extend said trapezoidal channel between said rib means, said sheet means being formed with a plurality of perforations in regions thereof lying above the level of said base walls of said rib means.

15. A device as recited in claim 14, said sheet means being wrapped about the exterior surfaces of said rib means and overlapping upper ends of said side walls.

16. A device as recited in claim 14, said sheet means being arranged withn said trapezoidal channel and overlapping upper ends of said side walls.

17. A device as recited in claim 14, said rib means being formed with recesses receiving said strap means in snapfitting relation, said sheet means being interposed between said rib means and at least one of said strap means attached to each of said side walls to secure said sheet means in place.

18. A device as recited in claim 14, said strap means including inverted V-section straps received over upper ends of said side walls and said sheet means.

19. A device as recited in claim 1, together with a plurality of coupling elements conformably receiving the adjacent end portions of modules abutting end-to-end to enclose said end portions.

* * * * *

UNITED STATES PATENT AND TRADEMARK OFFICE
CERTIFICATE OF CORRECTION

PATENT NO. : 4,014,135
DATED : March 29, 1977
INVENTOR(S) : George Greenbaum

It is certified that error appears in the above-identified patent and that said Letters Patent are hereby corrected as shown below:

Col. 1, Line 9, "The" should read as "They"; Col. 1, Line 58, "of" (2nd occurrence) should read "or"; Col. 3, line 12, "modules" should read as "module"; Col. 4, Line 51, "perferred" should read as "preferred"; Col. 5, Line 48, before "V-shaped" insert -a-; Col. 6, Line 23, before "of adjacent rows" insert -a V-section channel between and extending the length- ; Col. 6, Line 27, "fluid-row" should read as "fluid-flow"; Col. 6, Line 29, "acuate" should read as "acute"; Col. 8, Line 15, "withn" should read as "within".

Signed and Sealed this

Twentieth Day of September 1977

[SEAL]

Attest:

RUTH C. MASON
*Attesting Officer*

LUTRELLE F. PARKER
*Acting Commissioner of Patents and Trademarks*